United States Patent [19]
McNair

[11] Patent Number: 5,278,905
[45] Date of Patent: Jan. 11, 1994

[54] METHOD AND APPARATUS FOR PROCESSOR BASE ENCRYPTION

[75] Inventor: Bruce E. McNair, Holmdel, N.J.

[73] Assignee: AT&T Bell Laboratories, Murray Hill, N.J.

[21] Appl. No.: 882,327

[22] Filed: May 13, 1992

[51] Int. Cl.$^5$ ............................................. H04L 9/00
[52] U.S. Cl. ......................................... 380/44; 380/9; 380/46; 380/49; 380/50
[58] Field of Search ................... 380/9, 43, 44, 46, 49, 380/50, 4

[56] References Cited

U.S. PATENT DOCUMENTS

| | | | |
|---|---|---|---|
| 2,406,031 | 8/1946 | Parker | 380/44 X |
| 3,291,908 | 12/1966 | Ehrat | 380/43 |
| 3,876,832 | 4/1975 | Morgan et al. | 380/44 X |
| 3,967,066 | 6/1976 | Mathes | 380/43 X |
| 4,459,664 | 7/1984 | Pottier et al. | 380/4 X |

Primary Examiner—Bernarr E. Gregory
Attorney, Agent, or Firm—Eugene J. Rosenthal; Ronald D. Slusky

[57] ABSTRACT

The penalties and drawbacks associated with encrypting information in a portable device having a microprocessor are avoided by, in advance of the time for encryption to begin, having the microprocessor develop portions of a key sequence during periods of time that the microprocessor is not engaged in performing any function necessary for the operation of the portable device and storing each developed portion of the key sequence for later use in encrypting information. In one embodiment, at least one entire key sequence of sufficient length to encrypt a string of information that has a predetermined maximum possible length is developed and stored in advance of the beginning of any encrypting. In another embodiment, at least a predetermined length of key sequence less than the length necessary to encrypt a maximum length string is stored in advance of the beginning of any encrypting and key sequence generation continues on a time multiplexed basis while the string is being encrypted until the entire string is encrypted.

22 Claims, 3 Drawing Sheets

METHOD AND APPARATUS FOR PROCESSOR BASE ENCRYPTION

TECHNICAL FIELD

This invention relates to the encryption of information and, more particularly, to encrypting information when resources for performing such encryption are limited.

BACKGROUND OF THE INVENTION

One prior art method for encrypting a string of information is to exclusive OR each character of the string with a portion of a key sequence. A key sequence is a pseudo-random sequence of characters that is developed according to a cryptographic algorithm. One cryptographic algorithm is the National Bureau of Standards' Data Encryption Standard (DES). (The National Bureau of Standards' is known today as the National Institute of Science and Technology.) Typically there is a one-to-one correspondence between each character in the string of information to be encrypted and each character in the key sequence. The unencrypted version of the string is known as "plain text", while the encrypted version of the string is known as "cipher text".

With the rapid expansion of the number of portable communication devices, such as cordless and mobile telephones, there is an increased need for security when using such devices. The need is especially acute when such portable devices broadcast credit card numbers or other sensitive information via open air channels. This is because, without employing security techniques, anyone with a readily obtainable matching receiver can access the information as it is transmitted.

One way to generate key sequences, which requires the performance of complex computations, is to employ dedicated hardware. Such dedicated hardware can operate without impacting the functioning of any other portion of the portable device. However, as is well known, it is desirable that portable devices be as small, lightweight, power miserly and inexpensive as possible. Unfortunately, adding dedicated hardware to a portable device increases its size, weight, power consumption and cost. As a result, doing so is undesirable.

A known alternative approach for encrypting information by a portable device is to use the microprocessor typically found in such a device to generate the key sequence and to perform the required encryption. However, this approach suffers from the drawback that the performance of the complex computations necessary to generate a key sequence is extremely time consuming for the microprocessor. This drawback results in a severe limit on the rate at which information can be encrypted, and this limit, in turn, causes a delay in the transmission of the encrypted information. This delay is typically unacceptable to a user of the portable device who must await completion of the encryption and transmission before proceeding to his next task.

SUMMARY OF THE INVENTION

The penalties and drawbacks associated with encrypting information in a portable device having a microprocessor are avoided by, in advance of the time for encryption to begin, having the microprocessor develop portions of a key sequence during periods of time that the microprocessor is not engaged in performing any function necessary for the operation of the portable device and storing each developed portion of the key sequence for later use in encrypting information.

In one embodiment, at least one entire key sequence of sufficient length to encrypt a string of information that has a predetermined maximum possible length is developed and stored in advance of the beginning of any encrypting. In another embodiment, at least a predetermined length of key sequence less than the length necessary to encrypt a maximum length string is stored in advance of the beginning of any encrypting and key sequence generation continues on a time multiplexed basis while the string is being encrypted until the entire string is encrypted.

DETAILED DESCRIPTION

Figure 1:
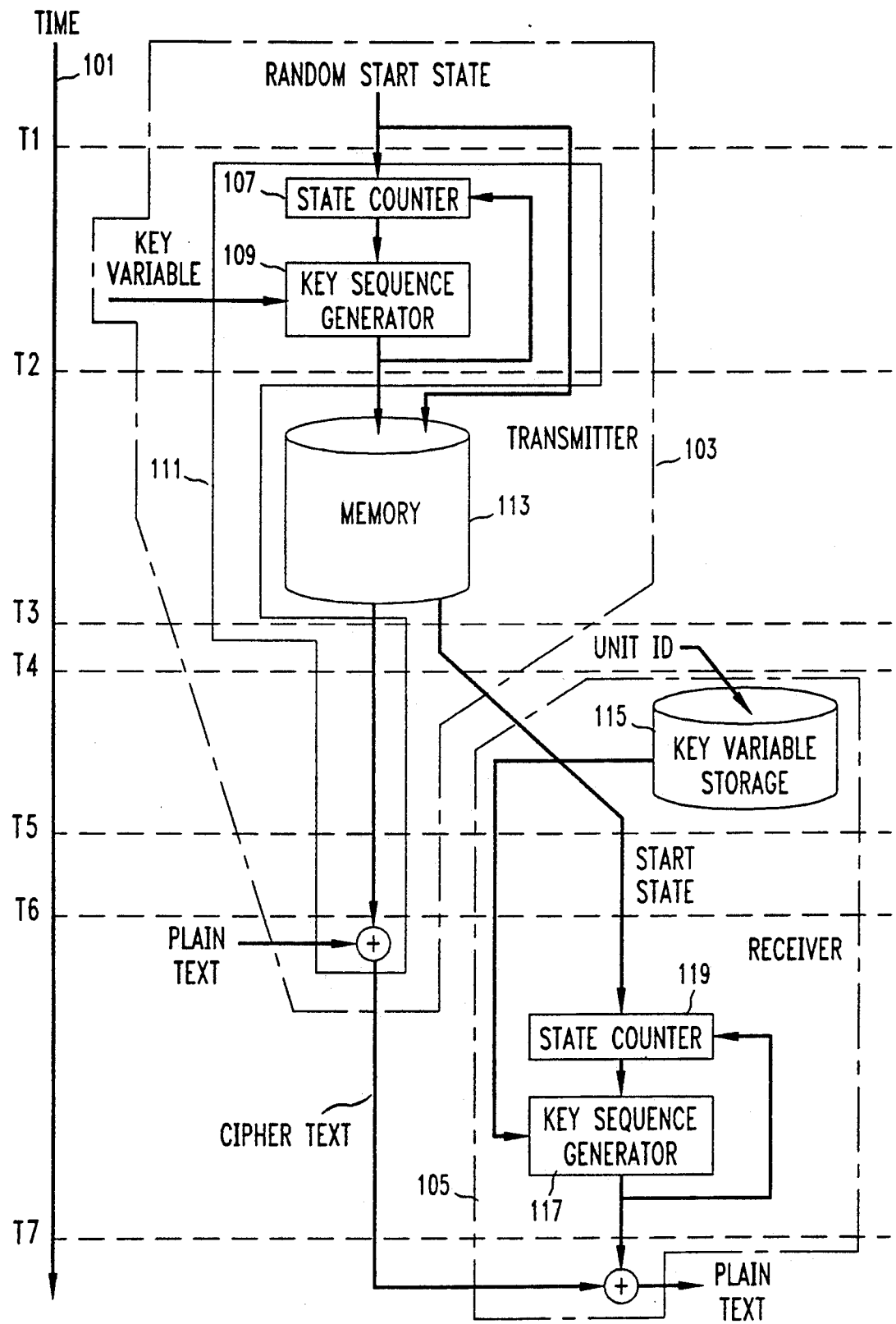
FIG. 1 shows a schematic representation of a system for communicating an encrypted string of information in accordance with the principles of the invention.

FIG. 1 shows a schematic representation of a system for communicating a string of information by encrypting it, in accordance with the principles of the invention. Transmitter 103 employs processor 111 to encrypt the string, in accordance with the principles of the invention, and transmits the encrypted string to receiver 105. Transmitter 103 is a small portion of a larger system that employs the processing power of processor 111 to perform other tasks besides the encryption and transmission of data. For example, transmitter 103 may be part of a mobile telephone and processor 111 may also be used to scan a keypad, light indicators, sound tones, or determine various call progress states, etc.

In accordance with an aspect of the invention, the functionality of state counter 107 and key sequence generator 109 is implemented in software executing on processor 111. Processor 111 could be, for example, the well known 8051 microcomputer. State counter 107 stores a current state which is used by key sequence generator 109 to develop both the next portion of the key sequence and the next current state. A typical portion size is a byte. The current state is typically a 64 bit number. At initialization, prior to the development of any portion of a key sequence, a random start state is supplied to state counter 107 for use as the current state.

Each time a portion of the key sequence to be used in encrypting the string is to be generated, a value of state counter 107 is supplied to key sequence generator 109. Also supplied to key sequence generator 109 is a key variable, e.g., X, where X is a predetermined number. The key variable is permanently stored in transmitter 103. It is employed as a parameter for the encryption algorithm of key sequence generator 104, herein assumed to be the DES, to determine which of a possible set of key sequences is actually generated. Transmitter 103 is uniquely identified by a unit ID, e.g., ID-X, which is associated with the key variable, X.

In accordance with an aspect of the invention, as each portion of a key sequence is generated by processor 111 it is stored in memory 113. Memory 113 also stores the value of the random start state used to generate the key sequence. When a plain text string is presented for encryption and transmission, processor 111 causes the random start state and the unit ID of transmitter 103 to be transmitted in unencrypted form to receiver 105. Thereafter, as each portion of the string is presented to transmitter 103, in plain text form, in accordance with an aspect of the invention, processor 111 retrieves from memory 113 a portion of the stored key sequence and exclusive ORs that portion of the key sequence with a correspondingly sized portion of the string. The resulting cipher text version of the string is transmitted to receiver 105.

Receiver 105 receives the unit ID from transmitter 103 and uses it as in index into key variable storage 115 to retrieve the key variable, X, for transmitter 103. Key variable storage 115 contains key variables for all the transmitters with which receiver 105 is compatible. The retrieved key variable is supplied as a parameter to key sequence generator 117. The random start state received by receiver 105 from transmitter 103 is used to initialize state counter 119.

It is anticipated that receiver 105 is a base station, and is, therefore, relatively unconstrained in terms of size, weight, power consumption, and cost. Therefore, key sequence generator 117 and state counter 119 can be implemented as dedicated hardware. As a result, they are capable of computing the necessary portions of a key sequence for use in decrypting portions of cipher text at the same speed that those portions are received, unlike processor 111. Therefore, portions of the cipher text can be exclusive ORed with the portions of the key sequence as each cipher text portion is received, by exclusive OR 121, to decrypt the cipher text and generate a reconstructed plain text version of the string.

In order to more fully appreciate the invention, several key points in sequence of the process of encrypting a string are marked along timeline 101. It is to be remembered that the problem solved by the invention is the fact that processor 111 is incapable of computing the portions of the key sequence necessary to encrypt a string of information at the same speed that the portions of the string are being presented. Therefore, in accordance with the principles of the invention, a key sequence for use in encrypting a string is developed in advance without knowing the contents of the string. Thus, at time T1, which is well before any portion of the string is presented, and therefore the contents of the string are entirely unknowable by processor 111, the random start state is supplied to state counter 107 and the generation of a key sequence having a sufficient length to encode a predetermined maximum length string is begun by processor 111. The random start state is also stored in memory 113 at time T1.

Between times T2 and T3, successive portions of a key sequence are stored in memory 113 as they are generated by processor 111, in accordance with an aspect of the invention. It is noted that the output of key sequence generator 109 feeds back to supply new values for state counter 107. In order to develop a key sequence, at least two different values of state counter 107 must be used so that at least two portions are supplied as output by key sequence generator 109. At time T3, processor 111 receives an indication that the string of information will be presented for encryption shortly. In preparation thereof, transmitter 103 causes its unit ID to be transmitted to receiver 105. If the invention is employed in a mobile telephone, such an indication could be the going off hook of the telephone.

At time T4, receiver 105 has received the unit ID and it retrieves key variable X corresponding to transmitter 103. Next, transmitter 103 retrieves the random start state from memory 113 and transmits it to receiver 105, at time T5. At time T6, the first portion of the string of information is presented to transmitter 103. Between times T6 and T7, processor 111 retrieves from memory 113, in accordance with an aspect of the invention, those portions of the stored key sequence that are necessary to encrypt each portion of the string as the portions of the string are presented. The string is encrypted, in accordance with an aspect of the invention, by using the retrieved portions of the key sequence and the resulting cipher text is transmitted to receiver 105. As noted, receiver 105 generates the portions of the corresponding key sequence necessary to decrypt the cipher text contemporaneously with the reception of the cipher texts and regenerates the plain text string, in real time.

If only critical information is encrypted, and the encrypted string is an authorization command or billing information, it is possible for an attacker to record the encrypted string in encrypted form. Then, after making his own service request, the attacker retransmits the recorded encrypted string. The string is received by the base station and, accordingly, decrypted without there being any indication that the service request of the attacker is unauthorized.

In order to protect against such recording and replaying, the random start state advantageously includes at least a randomly chosen number and a monotonically increasing function. The base station assumes that the encrypted string was recorded if it receives a string that does not have a random start state that is greater than the value of the previous random start state. In one embodiment, the monotonically increasing function employed is information related to the date and time at which the key sequence is generated. As a result, an age window of acceptable random start state values may thereby be imposed so that "old" random start states are deemed invalid.

Figure 2:
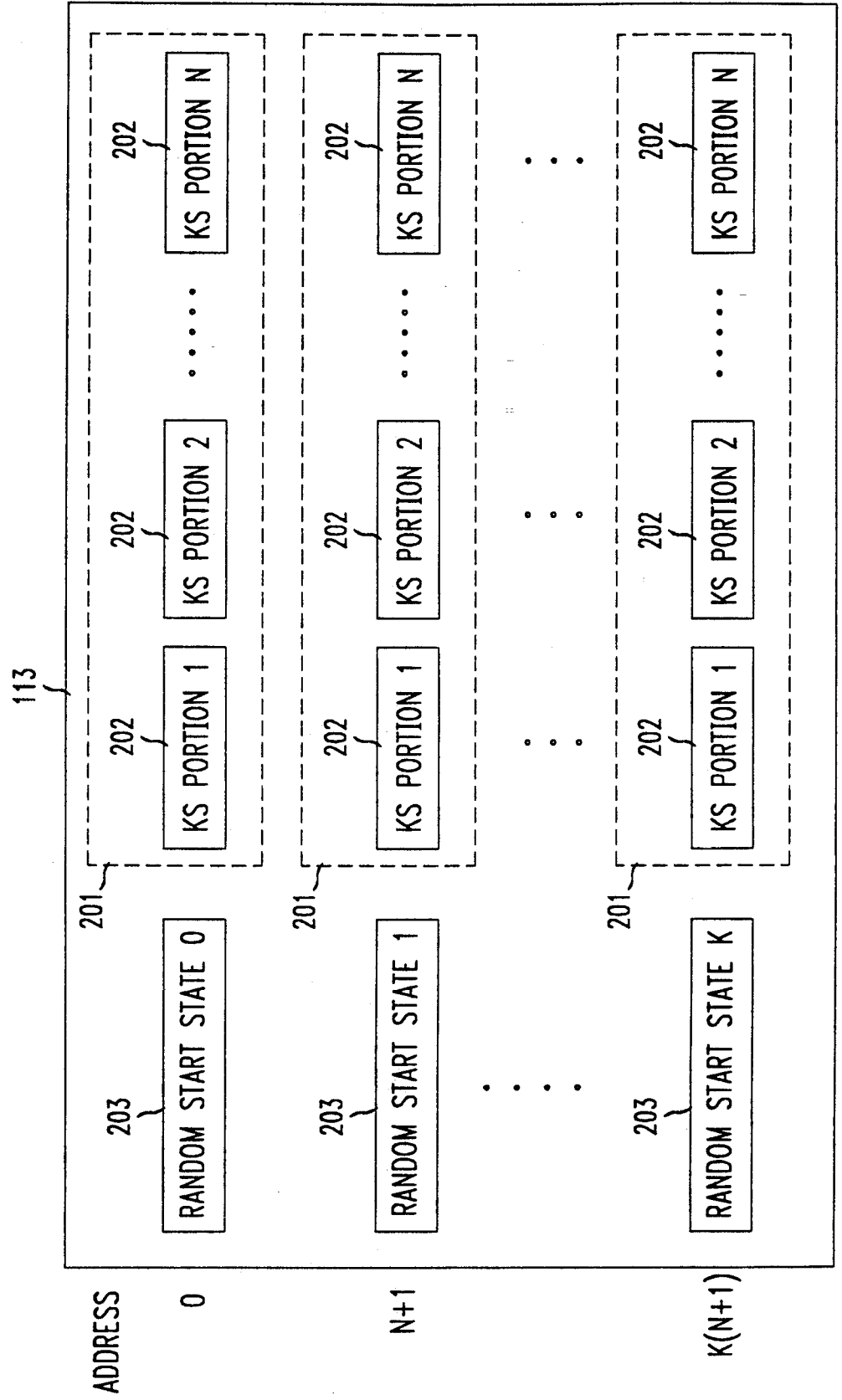
FIG. 2 shows an arrangement of key sequences in a memory, in accordance with the invention.

FIG. 2 shows an arrangement of key sequences in memory 113, in accordance with the invention. Each key sequence 201 includes N key sequence (KS) portions 202 and each is associated with its corresponding random start state 203. Memory 113 can contain K key sequences and associated random start states. Thus, advantageously, K strings of information can be rapidly encrypted by processor 111 if memory 113 is entirely filled with key sequences prior to the start of any encryption.

Figure 3:
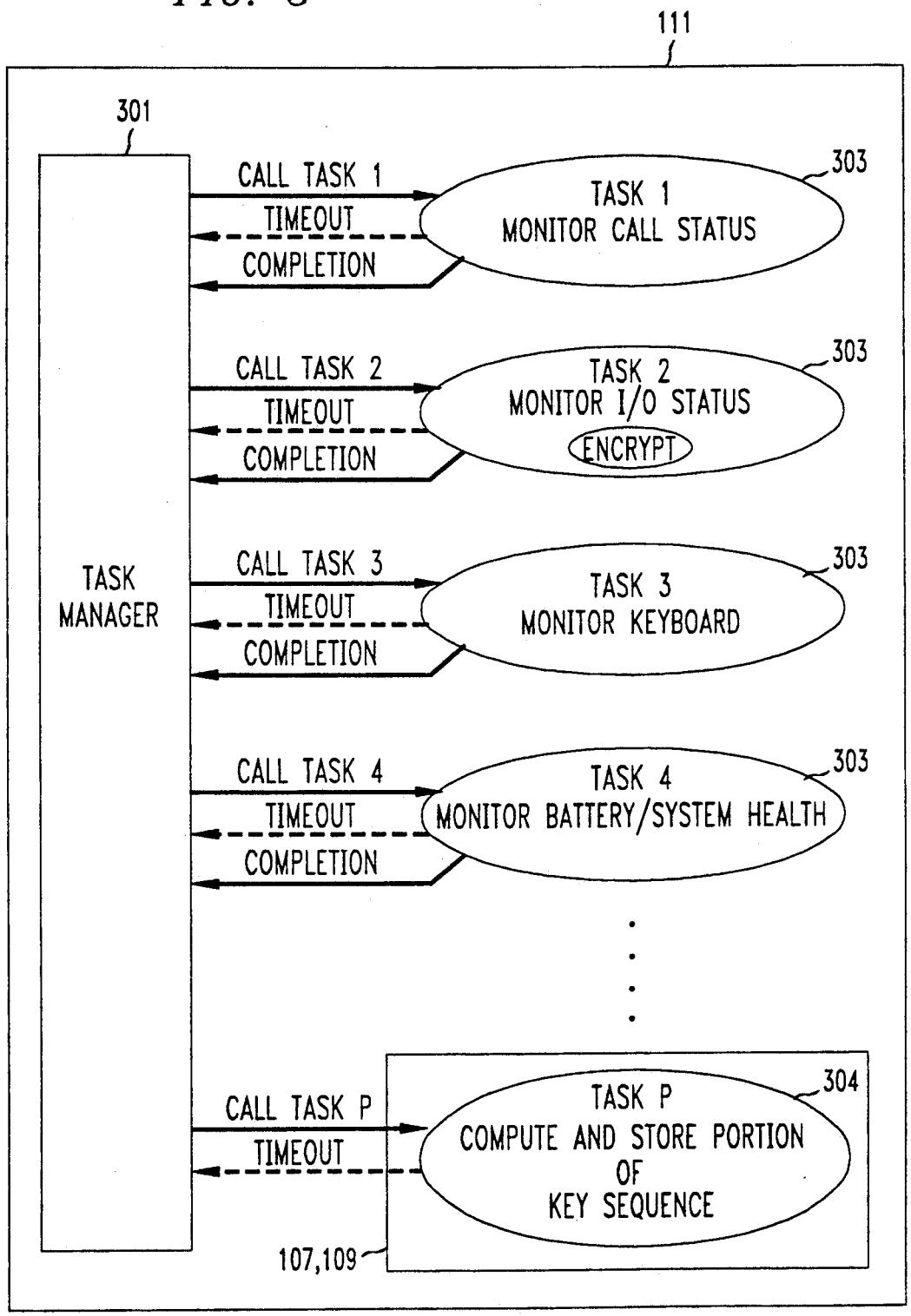
FIG. 3 shows an exploded view of a task management structure for operating a processor according to the principles of the invention.

FIG. 3 shows an exploded view of a software task management structure for operating processor 111, according to the principles of the invention. Tasks 303 are software tasks for use in a mobile telephone. Processor 111 must encrypt all billing information that it is to transmit.

Operation of task manager 301 is such that it allots each particular task 303 a predetermined portion of time during which processor 111 can execute that task. The allotment of time portions to tasks is based on the well known so-called "strict round robin schedule". Therefore, task manager 301 transfers control to each of tasks 303 sequentially. Each task 303 executes for its entire allotted time or until the task signals its completion to task manager 301.

Task 304 performs the key sequence generation function which is represented in FIG. 1 by state counter 107 and key sequence generator 109. Task manager 301 transfers control to task 304 as it does to any of tasks 303, in accordance with its round robin schedule. Unlike tasks 303, which may complete their function before their allotted time expires, task 304 can never complete its function prior to the expiration of its allotted time. Instead, task 304 continually generates new key sequence values for the entire time allotted to it.

In a preferred embodiment, task 304 discards old, unused key sequenced as it generates new ones. This can be done by writing to memory 113 sequentially from address 0 and, after writing the Kth key sequence, resetting the address for writing new key sequences back to address 0. Alternatively, the age of the key sequence can be determined from a comparison between the random start state associated with the key sequence and the current data and time.

Those skilled in the art will recognize that other types of task managers, e.g., interrupt driven task managers, can also be used with the invention. For instance, if the task manager were a strictly interrupt driven task manager, task 304, which generates and stores a key sequence, would be the only task that executes when no interrupts were being serviced. An alternate characterization of such an embodiment is that processor 111 detects when it need not perform any of its other tasks and, at such times, it develops portions of a key sequence.

Table 1 shows pseudocode for implementing task 304 on processor 111 using task manager 301. The pseudocode generates random start states and their assoicated key sequences and writes them to memory 113, as described above. If an interrupt driven task manager is used, the pseudocode of Table 1 would be the main task.

TABLE 1

```
load key variable
while (true)
{for location=0..K
 {generate random start state
  write start state to memory 113(location, 0)
  input=start state
  for key sequence number=1..N
   {output=DES(input, key variable)
    input=output
    write output to memory 113(location, key sequence number)
   }
 }
}
```

It will be recognized by those skilled in the art that the entire key sequence need not be generated in advance of the presentation of any portion of the string to be encrypted to achieve some advantage. In a preferred embodiment, the full potential advantage of the invention can be realized by ensuring that the generation of the key sequence completes before the last portion of the input string is presented.

To use the above described technique for reception and decryption of encrypted strings, a key sequence and its associated random start state are developed and stored in memory in advance of reception of the string, as described above, in accordance with the principles of the invention. When it is time to begin reception and decryption of the encrypted string, or slightly therebefore to allow for transmission and processing time, in accordance with an aspect of the invention, the portable unit transmits its unit ID and the stored random start state to the base unit. The base unit loads its state counter with the random start state and retrieves the key variable for the portable unit by indexing into its key storage using the unit ID of the portable unit. Thereafter, the base unit on the fly, in real time, generates a key sequence and encodes the plain text string. The base unit transmits the resulting cipher text to the portable unit. The portable unit receives the cipher text and decrypts it by using the key sequence it has stored in memory.

The foregoing merely illustrates the principles of the inventions. It will thus be appreciated that those skilled in the art will be able to devise various arrangements which, although not explicitly described or shown herein, embody the principles of the invention and are thus within its spirit and scope.

I claim:

1. Apparatus for use in a system for performing a plurality of tasks, one of said tasks being to encrypt a non-infinite length string of data, said apparatus comprising:

a processor for generating a key sequence for use in encrypting data and for performing others of said tasks;

means for operating said processor in advance of the time that any portion of the contents of said string is known to transit a plurality of states and to generate while in each of said states a portion of a key sequence for use in encrypting said string, said transiting and generating being intermixed with the performance of said others of said tasks; and means for storing said generated portions of said key sequence.

2. The invention as defined in claim 1 wherein each developed key sequence portion has a length less than the length of a key sequence necessary to decrypt the possible maximum length of said string.

3. The invention as defined in claim 1 wherein said means for storing stores said portions at least until either a key sequence of sufficient length to encrypt the entirety of said string is available or said portion of said key sequence is used to encrypt a portion of said string.

4. The invention as defined in claim 1 further including means responsive to said stored portions of said key sequence for encrypting said string.

5. Apparatus for use in a system for performing a plurality of tasks, one of said tasks being to encrypt a non-infinite length string of data, said apparatus comprising:

a processor for generating a key sequence for use in encrypting data and for performing others of said tasks;

means for operating said processor to generate said key sequence so that the generating by said processor is intermixed with the performance by said processor of said others of said tasks, the generating requiring said processor to transit a plurality of states to generate in each of said states a portion of a key sequence for use in encrypting the contents of a particular portion of said string that is as yet unknown by said apparatus; and means for storing said generated portions of said key sequence at least until said contents of said particular portions of said string become known to said apparatus.

6. The invention as defined in claim 5 further including means responsive to said stored portions of said key sequence for encrypting said string.

7. A method for use in a system having a processor for performing a plurality of functions, one of said functions being the generation of key sequence for use in encrypting a non-infinite length string of data, the method characterized by the steps of:

determining time periods during which said processor need not perform any of said functions other than the generation of key sequence and operating said processor, during said determined time periods, to transit a plurality of states in each state of which is generated a portion of a key sequence for use in encrypting the contents of a particular portion of said string that is as yet unknown by said processor; and storing said generated portions of said key sequence.

8. The invention as defined in claim 7 further including the step of encrypting said string as a function of said stored portions of said key sequence.

9. A method for use in a system having a processor for performing a plurality of functions, one of said functions being the generation of a key sequence for use in encrypting a non-infinite length string of data, said key sequence generation requiring said processor to transit a plurality of states so as to generate in each of said states a portion of a key sequence for use in encrypting the contents of a particular portion of said string, the method characterized by the steps of:

time multiplexing the performance of said key generation function by said processor with the performance of other tasks required to be performed by said processor to generate portions of a key sequence, that are to be subsequently used to encrypt portions of said string that are as yet unknown by said processor;

storing said generated portions of said key sequence; and encrypting said string as a function of said stored portions of said key sequence.

10. Apparatus for use in a system for performing a plurality of tasks, one of said tasks being a task for decrypting a string of data supplied from a source and having a non-infinite length, said apparatus comprising:

a processor for generating a key sequence for use in decrypting data and for performing others of said tasks;

means for operating said processor in advance of the time that any portion of the contents of said string is known to transit a plurality of states and to generate while in each of said stakes a portion of a key sequence for use in decrypting said string, said transiting and generating being intermixed with the performance of said others of said tasks;

means for storing said generated portions of said key sequence; and means for transmitting to said source initialization information that was used to generate said key sequence.

11. The invention as defined in claim 10 wherein each developed key sequence portion has a length less than the length of a key sequence necessary to decrypt the possible maximum length of said string.

12. The invention as defined in claim 10 further including means responsive to said stored portions of said key sequence for decrypting said string.

13. The invention as defined in claim 10 wherein said means for storing stores said portions at least until either a key sequence of sufficient length to decrypt the entirety of said string is available or said portion of said key sequence is used to decrypt a portion of said string.

14. The invention as defined in claim 10 wherein said initialization information includes at least an identifier of said system and a starting state.

15. Apparatus for use in a system for performing a plurality of tasks, one of said tasks being to decrypt a non-infinite length string of data supplied from a source, said apparatus comprising:

a processor for generating a key sequence for use in decrypting data and for performing others of said tasks;

means for operating said processor to generate said key sequence so that the generating is intermixed with the performance of others of said tasks, the generating requiring said processor to transit a plurality of states so as to generate in each of said states a portion of a key sequence for use in decrypting the contents of a particular portion of said string that is as yet unknown by said apparatus;

means for storing said generated portions of said key sequence at least until said contents of said particular portions of said string become known to said apparatus; and means for transmitting to said source initialization information that was used to develop said key sequence.

16. The invention as defined in claim 15 further including means responsive to said stored portions of said key sequence for decrypting said string.

17. The invention as defined in claim 15 wherein said initialization information includes at least an identifier of said system and a starting state.

18. A method for use in a system having a processor for performing a plurality of functions, one of said functions being the generation of key sequence for use in decrypting a non-infinite length string of data supplied from a source, the method characterized by the steps of:

determining time periods during which said processor need not perform any of said functions other than the generation of key sequence and operating said processor, during said determined time periods, to transit a plurality of states in each state of which is generated a portion of a key sequence for use in decrypting the contents of a particular portion of said string that is as yet unknown by said processor; and storing said generated portions of said key sequence; and transmitting to said source initialization information that was used to develop said key sequence.

19. The invention as defined in claim 18 further including the step of decrypting said string as a function of said stored portions of said key sequence.

20. The invention as defined in claim 18 wherein said initialization information includes at least an identifier of said system and a starting state.

21. A method for use in a system having a processor for performing a plurality of functions, one of said functions being the generation of a key sequence for use in decrypting a non-infinite length string of data supplied from a source, said key sequence generation requiring said processor to transit a plurality of states so as to generate in each state a portion of a key sequence for use in decrypting the contents of a particular portion of said string, the method characterized by the steps of:

time multiplexing the performance of said key generation function by said processor with the performance of other tasks required to be performed by said processor to generate portions of a key sequence that are to be subsequently used to decrypt portions of said string that are as yet unknown by said processor;

storing said generated portions of said key sequence;

transmitting to said source initialization information that was used to said key sequence; and decrypting said string as a function of said stored portions of said key sequence.

22. The invention as defined in claim 21 wherein said initialization information includes at least an identifier of said system and a starting state.

* * * * *